R. S. PEIRCE.
HOSE COUPLING.
APPLICATION FILED JULY 21, 1919.
1,357,820.
Patented Nov. 2, 1920.
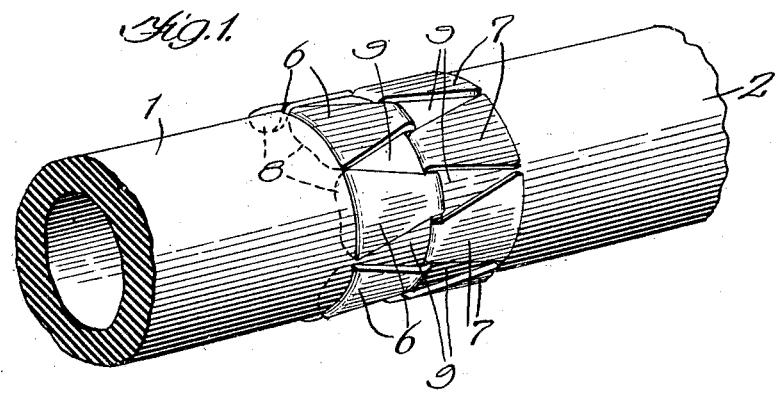
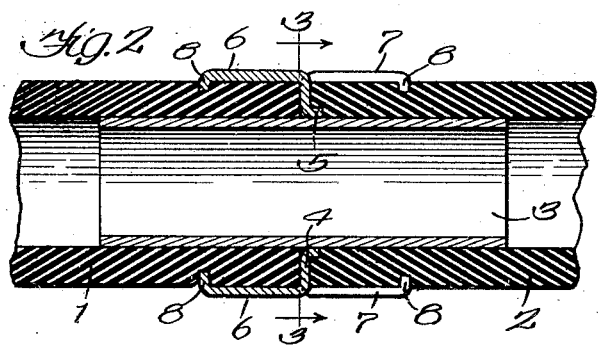 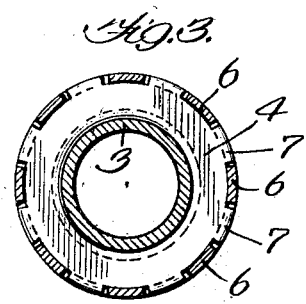
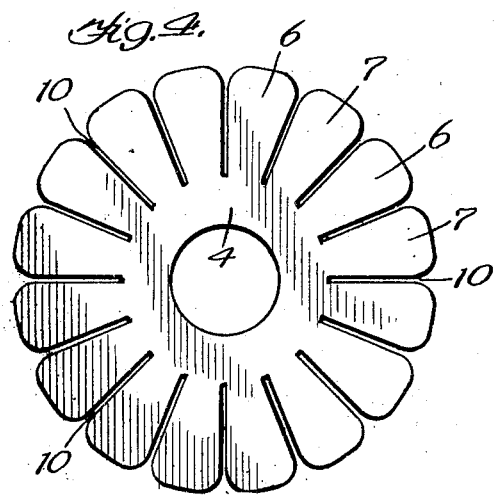 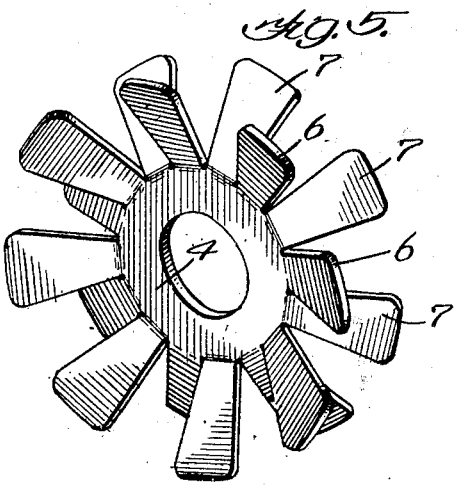
Inventor:
Ralph S. Peirce

UNITED STATES PATENT OFFICE.

RALPH S. PEIRCE, OF HINSDALE, ILLINOIS.

HOSE-COUPLING.

1,357,820.  Specification of Letters Patent.  Patented Nov. 2, 1920.

Application filed July 21, 1919. Serial No. 312,452.

*To all whom it may concern:*

Be it known that I, RALPH S. PEIRCE, citizen of the United States, residing at Hinsdale, in the county of Dupage and State of Illinois, have invented a certain new and useful Improvement in Hose-Couplings, of which the following is a full, clear, concise, and exact description.

My invention relates to hose couplings and has for its object the provision of a coupler which will hold the adjacent ends of adjacent hose sections in close and permanent relation.

The coupling includes a hose clencher having a body portion between the adjacent ends of adjacent hose sections and formed with oppositely directed prongs proceeding from the rim of said body portion and preferably but not necessarily formed at their outer ends with hooks that are embedded within the hose sections. The hooks and prong ends form substantially closed rings that prevent leaky bulges of the hose.

In the preferred embodiment of the invention there are two oppositely directed sets of such prongs which are tapered, the prongs of each set alternating with the prongs of the other set. There is also preferably employed a tube in the adjacent ends of said hose sections, the tube being surrounded by the body portion of the prong that is in close approximation thereto.

I will explain my invention more fully by reference to the accompanying drawing showing the preferred embodiment thereof and in which Figure 1 is a perspective view illustrating the adjacent ends of two adjacent hose sections which are coupled by the device of my invention; Fig. 2 is a longitudinal sectional view of the structure appearing in Fig. 1; Fig. 3 is a cross sectional view on line 3—3 of Fig. 2; Fig. 4 illustrates the clencher in the first stage of its formation; and Fig. 5 illustrates the initiation of the second step in the formation of the clencher.

Like parts are indicated by similar characters of reference throughout the different figures.

Parts of two continuous hose sections 1 and 2 are illustrated. A tube 3, preferably rigid and metallic, is disposed in the adjacent ends of the hose sections, its function being to maintain the hose sections in alinement at their adjacent ends. The clencher, which is employed for maintaining the hose sections together, is preferably a single piece of metal and includes a body portion 4 that is disposed between the adjacent ends of the hose sections and which surrounds the aforesaid tube and is in close approximation thereto. To reduce the wear of said portion upon the tube and to strengthen the clencher I form the clencher with a flange 5 at the inner circle thereof, this flnage engaging said tube. The clencher is formed with two oppositely directed sets of prongs 6 and 7 that proceed from the rim of the body portion 4. The outer ends of these prongs are formed with hooks 8 which are embedded in the hose sections to prevent them from relative longitudinal movement. The prongs of each set preferably alternate with the prongs of the other set so that both hose sections are subject to the same clenching action. The prongs desirably taper toward their bases whereby the prongs of each set are closely approached at their outer ends to form triangular spaces 9 into which the material of the hose may bulge, the function of the hooks 8 in preventing separation of the hose sections being supplemented by the engagement of the bulging portions of the hose sections with the sloping sides of the prongs. By the structure illustrated, such a firm mechanical union is formed between the adjacent ends of adjacent hose sections that the hose is quite rigid in the zone of the clencher, the hose sections being prevented from working apart and leakage between the ends of the hose sections and between these hose sections and the tube 3 being thoroughly prevented by the substantially closed ring formed by the outer ends of the prongs and also by the hooks thereon.

The clencher may be formed from the blank illustrated in Fig. 4 which shows the inner body portion 4 from which the prongs 6 and 7 radiate. These prongs are made tapering merely by radially slotting the blank as indicated at 10. The prongs are alternately extended in opposite directions, Fig. 5 showing the initial bending of the prongs. The hooks 8 are provided upon the prongs at any suitable stage of the process of making the clencher. This may be done after the prongs are brought at or nearly into the positions they are ultimately to occupy.

The metal of which the clencher is made is preferably sufficiently flexible so that the prongs may be flared enough to permit the entry of the adjacent ends of the hose sections into the space surrounded thereby whereafter the prongs are depressed to embed their hooks within the hose sections as illustrated in Figs. 1 and 2.

While I have herein shown and particularly described the preferred embodiment of the invention I do not wish to be limited to the precise details of construction shown as changes may readily be made without departing from the spirit of my invention, but having thus described my invention I claim as new and desire to secure by Letters Patent the following:—

1. The combination with two contiguous sections of a hose; of a tube in the adjacent ends of said hose sections; and a hose clencher having a body portion between the adjacent ends of said hose sections and surrounding said tube in close approximation thereto and formed with two oppositely directed sets of prongs proceeding from the rim of said body portion and formed at their outer ends with hooks embedded within the hose sections, the prongs of each set alternating with the prongs of the other set and the hooks thereof forming a substantially closed ring.

2. The combination with two contiguous sections of a hose; of a tube in the adjacent ends of said hose sections; and a single piece hose clencher having a body portion between the adjacent ends of said hose sections and surrounding said tube in close approximation thereto and formed with oppositely directed prongs proceeding from the rim of said body portion and formed at their outer ends with hooks embedded within the hose sections and forming substantially closed rings.

3. The combination with two contiguous sections of a hose; of a tube in the adjacent ends of said hose sections; and a single piece hose clencher having a body portion between the adjacent ends of said hose sections and surrounding said tube and formed with two oppositely directed sets of prongs proceeding from the rim of said body portion and formed at their outer ends with hooks embedded within the hose sections and forming substantially closed rings, the prongs of each set alternating with the prongs of the other set.

4. The combination with two contiguous sections of a hose; of a tube in the adjacent ends of said hose sections; and a single piece hose clencher having a body portion between the adjacent ends of said hose sections and surrounding said tube and formed with oppositely directed prongs proceeding from the rim of said body portion and formed at their outer ends with hooks embedded within the hose sections and forming substantially closed rings.

5. The combination with two contiguous sections of a hose; of a hose clencher having a body portion between the adjacent ends of said hose sections and formed with two oppositely directed sets of prongs proceeding from the rim of said body portion and formed at their outer ends with hooks embedded within the hose sections and forming substantially closed rings, the prongs of each set alternating with the prongs of the other set.

6. The combination with two contiguous sections of a hose; of a single piece hose clencher having a body portion between the adjacent ends of said hose sections and formed with oppositely directed prongs proceeding from the rim of said body portion and formed at their outer ends with hooks and forming substantially closed rings embedded within the hose sections.

7. The combination with two contiguous sections of a hose; of a hose clencher having a body portion between the adjacent ends of said hose sections and formed with two oppositely directed sets of prongs proceeding from the rim of said body portion and formed at their outer ends with hooks embedded within the hose sections and forming substantially closed rings, the prongs of each set alternating with the prongs of the other set.

8. The combination with two contiguous sections of a hose; of a single piece hose clencher having a body portion between the adjacent ends of said hose sections and formed with oppositely directed prongs proceeding from the rim of said body portion and formed at their outer ends with hooks embedded within the hose sections and forming substantially closed rings.

9. The combination with two contiguous sections of a hose; of a tube in the adjacent ends of said hose sections; and a hose clencher having a body portion between the adjacent ends of said hose sections and surrounding said tube in close approximation thereto and formed with two oppositely directed sets of prongs tapering toward their bases and proceeding from the rim of said body portion and formed at their outer ends with hooks embedded within the hose sections and forming substantially closed rings, the prongs of each set alternating with the prongs of the other set.

10. The combination with two contiguous sections of a hose; of a hose clencher having a body portion between the adjacent ends of said hose sections and formed with two oppositely directed sets of prongs tapering toward their bases and proceeding from the rim of said body portion and formed at their outer ends with hooks embedded within the hose sections, the prongs of each set alternating with the prongs of the other set.

11. The combination with two contiguous sections of a hose; of a tube in the adjacent ends of said hose sections; and a single piece hose clencher having a body portion between the adjacent ends of said hose sections and surrounding said tube in close approximation thereto and formed with two oppositely directed sets of prongs proceeding from the rim of said body portion and closely approached at their outer ends to form substantially closed rings.

In witness whereof, I hereunto subscribe my name this 14th day of July, A. D. 1919.

RALPH S. PEIRCE.